US009001625B2

(12) United States Patent
Essery et al.

(10) Patent No.: US 9,001,625 B2
(45) Date of Patent: Apr. 7, 2015

(54) WEARABLE ELECTRONIC DEVICE

(75) Inventors: Thomas Essery, Rockfall, CT (US); Alexander Kniffin, Farmington, CT (US)

(73) Assignee: Timex Group USA, Inc., Middlebury, CT (US)

( * ) Notice: Subject to any disclaimer, the term of this patent is extended or adjusted under 35 U.S.C. 154(b) by 364 days.

(21) Appl. No.: 13/591,302

(22) Filed: Aug. 22, 2012

(65) Prior Publication Data

US 2013/0064045 A1    Mar. 14, 2013

Related U.S. Application Data

(60) Provisional application No. 61/532,230, filed on Sep. 8, 2011.

(51) Int. Cl.
*G04R 20/00* (2013.01)
*H04W 88/02* (2009.01)

(52) U.S. Cl.
CPC ........................................ *H04W 88/02* (2013.01)

(58) Field of Classification Search
USPC ................................ 368/46, 47, 49, 52, 187
See application file for complete search history.

(56) References Cited

U.S. PATENT DOCUMENTS

| | | | |
|---|---|---|---|
| 4,212,159 A | 7/1980 | Noble et al. | |
| 4,254,490 A | 3/1981 | Ganter | |
| 4,262,345 A | 4/1981 | Ganter et al. | |
| 4,396,294 A | 8/1983 | Yoshida | |
| 4,600,316 A | 7/1986 | Besson | |
| 5,583,833 A * | 12/1996 | Capps et al. | 368/185 |
| 6,223,050 B1 | 4/2001 | Roberts, Jr. | |
| 6,343,050 B1 | 1/2002 | Kwok | |
| 6,556,222 B1 | 4/2003 | Narayanaswami | |
| 6,601,988 B2 * | 8/2003 | Molander | 368/187 |
| 6,714,486 B2 * | 3/2004 | Biggs | 368/82 |
| 6,751,164 B1 | 6/2004 | Sekiguchi | |
| 7,167,417 B2 | 1/2007 | Akahane et al. | |
| 7,274,375 B1 * | 9/2007 | David | 345/619 |
| 7,646,678 B2 | 1/2010 | Imai et al. | |
| 7,751,285 B1 * | 7/2010 | Cain | 368/82 |

(Continued)

FOREIGN PATENT DOCUMENTS

| | | | |
|---|---|---|---|
| JP | 2004-93557 | * | 3/2004 |
| JP | 2004/117090 | | 4/2004 |

(Continued)

*Primary Examiner* — Vit W Miska
(74) *Attorney, Agent, or Firm* — Carmody Torrance Sandak & Hennessey LLP (57) ABSTRACT

An analog wearable electronic device that is operationally coupleable to a transmitting device. The transmitting device includes means for viewing a simulation of a display provided on the wearable electronic device, changing information displayable on the simulated display and transmitting the changed information and/or information from which the changed information is derivable to the wearable electronic device. The wearable electronic device includes a receiver for receiving from the transmitting device the changed information and/or the information from which the changed information is derivable. A controller assembly processes the changed information and/or derives the changed information, and an actuation mechanism moves a display indicator based at least in part on the changed information. The changed information is thereafter reflected on the display of the wearable electronic device by the display indicator.

17 Claims, 7 Drawing Sheets

(56) References Cited

U.S. PATENT DOCUMENTS

| | | |
|---|---|---|
| 7,859,947 B2 * 12/2010 | Kawai | 368/10 |
| 7,907,476 B2 * 3/2011 | Lee | 368/10 |
| 8,588,033 B2 11/2013 | Pozzo Di Borgo et al. | |
| 2001/0055244 A1 * 12/2001 | Kim | 368/73 |
| 2004/0047241 A1 3/2004 | Weng | |
| 2004/0225966 A1 * 11/2004 | Besharat et al. | 715/705 |
| 2005/0105401 A1 * 5/2005 | Akahane et al. | 368/187 |
| 2005/0278757 A1 * 12/2005 | Grossman et al. | 725/87 |
| 2008/0186808 A1 8/2008 | Lee | |
| 2009/0154296 A1 6/2009 | Behling et al. | |
| 2012/0092383 A1 * 4/2012 | Hysek et al. | 345/684 |
| 2013/0170324 A1 7/2013 | Tu et al. | |

FOREIGN PATENT DOCUMENTS

| | | |
|---|---|---|
| JP | 2009/217815 | 9/2009 |
| WO | 2006/111481 | 10/2006 |

* cited by examiner

WEARABLE ELECTRONIC DEVICE

CROSS REFERENCE TO RELATED APPLICATIONS

This application claims the benefit of U.S. Provisional Application No. 61/532,230, files Sep. 8, 2011, the subject matter of which is incorporated by reference in its entirety.

BACKGROUND OF THE INVENTION

The present invention is directed generally to wearable electronic devices generally, and in particular, to a wearable electronic device that interfaces with a transmitting device to cause the wearable electronic device to enable and/or disable a feature of a mode in which the wearable electronic device is operable, operate in a mode in which the wearable electronic device is operable and/or the change information that is displayable on a display of the wearable electronic device. Methodologies to carry out these objectives and functionality are also provided.

Wearable electronic devices that have features designed to assist a user to set the device, for example, are known from U.S. Pat. Nos. 6,223,050; 6,751,164 and 7,167,417. However, such constructions are still believed to have deficiencies. As such, designers continue to look for ways to facilitate a user's interaction with wearable electronic devices.

It is believed that further advances to the state of the art are both desirable and achievable. In particular, it is desirable to provide users with an ability to more easily enable and/or disable a feature of a mode in which the wearable electronic device is operable, operate the wearable electronic device in a mode in which the wearable electronic device is operable and/or the change information that is displayable on a display of the wearable electronic device, as well as to provide methodologies to carry out the foregoing functionality.

SUMMARY AND OBJECTIVES OF THE INVENTION

It is thus an objective of the present invention to overcome the perceived deficiencies in the prior art.

Specifically, it is an objective of the present invention to provide a user with an improved wearable electronic device that interfaces with a transmitting device to cause the wearable electronic device to enable and/or disable a feature of a mode in which the wearable electronic device is operable, operate in a mode in which the wearable electronic device is operable and/or the change information that is displayable on a display of the wearable electronic device.

It is a further objective of the present invention to provide a transmitting device that can carry out and/or facilitate the foregoing objectives.

Yet a further objective of the present invention to provide an application that can be downloaded to the transmitting device for carrying out and/or facilitating the foregoing objectives.

Still a further objective of the present invention is to provide methodologies for carrying out and/or facilitating the foregoing.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

Therefore, to overcome the perceived deficiencies in the prior art and to achieve the objects and advantages set forth above and below, a preferred embodiment of the present invention is, generally speaking, directed to a wearable electronic device of the type wherein information is conveyed in an analog manner at least in part by the use of at least one display indicator, wherein the wearable electronic device is operationally coupleable to a transmitting device, wherein the transmitting device comprises means for (i) viewing a simulation of a display provided on the wearable electronic device, (ii) changing information displayable on the simulated display and (iii) transmitting at least one of (a) the changed information and (b) information from which the changed information is derivable to the wearable electronic device, wherein the wearable electronic device comprises a receiver for receiving from the transmitting device at least one of (i) the changed information and (ii) the information from which the changed information is derivable; a controller assembly, operatively coupled to the receiver, for at least one of processing the changed information and deriving the changed information; and an actuation mechanism, operatively coupled to the controller assembly, for moving the at least one display indicator in a direction based at least in part on the changed information; wherein the changed information is thereafter reflected on the display of the wearable electronic device in the analog manner by the at least one display indicator.

In a another preferred embodiment, a method of changing information on a wearable electronic device of the type wherein information is conveyed in an analog manner at least in part by the use of at least one display indicator is provided, wherein the wearable electronic device is operationally coupleable to a transmitting device, wherein the transmitting device comprises means for viewing a simulation of a display that is displayable on the wearable electronic device, changing information displayable on the simulated display and transmitting at least one of (i) the changed information and (ii) information from which the changed information is derivable to the wearable electronic device, wherein the method comprises the steps of viewing, on the transmitting device, a simulation of a display that is provided on the wearable electronic device; changing information displayable on the simulated display; transmitting at least one of (i) the changed information and (ii) information from which the changed information is derivable to the wearable electronic device; receiving, by the wearable electronic device, at least one of (i) the changed information and (ii) information from which the changed in information is derivable from the transmitting device; in the wearable electronic device, at least one of processing the changed information and deriving the changed information; and moving the at least one display indicator in a direction based at least in part on the changed information; wherein the changed information is thereafter reflected on the display of the wearable electronic device in the analog manner by the at least one display indicator.

In yet another preferred embodiment, a wearable electronic device of the type operable in at least one mode is provided, wherein the wearable electronic device is operationally coupleable to a transmitting device, wherein the transmitting device comprises means for transmitting a signal for at least one of causing (i) at least one of an enabling and disabling of a feature of a mode in which the wearable electronic device is operable, (i) a selecting of a mode in which the wearable electronic device is operable, (i) information that is displayable on a display of the wearable electronic device to be changed, wherein the wearable electronic device comprises a receiver for receiving the signal from the transmitting device; a display that at least one displays (i) the enabled feature of the mode in which the wearable electronic device is operable, (ii) the selected mode and (iii) the changed information; and a controller assembly, operatively coupled to the receiver, for processing the signal and based thereon (i) at least one of enabling and disabling a feature of a mode in which the wearable electronic device is operable, (i) selecting a mode in which the wearable electronic device is operable and (iii) causing the adjustment of the information on the display.

In a preferred embodiment, the electronic device is a timepiece in the form of a wristwatch.

BRIEF DESCRIPTION OF THE DRAWINGS

The above set forth and other features of the invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DETAILED DESCRIPTION OF THE PREFERRED EMBODIMENTS

The present invention is directed to a wearable electronic device that is operable in at least one mode, and preferably operable in a plurality of modes. Such modes, by way of example and not limitation, may include a time of day mode, a timer mode, any one of a number of physiological display modes, such as by way of example, a heart rate mode, a blood pressure mode, a blood glucose mode and/or any oxygenation mode, a number of modes for which a sensor may be needed, such as a compass, altitude and/or water depth, and/or to display a wide range of other parameters, such as water pressure, oxygen left in a diver's tank (i.e. a diver's watch); air pressure and moisture (i.e. a weather watch); object finder (i.e. to find one's car or way back to a starting location); speed and distance (a runner's watch); displaying how much money is in a debit account and any combination of the foregoing. Moreover, multiple sensors can provide for a plurality of displays, while multipurpose displays (such as an LCD screen) expands the number of displays possible in one display area as set forth in greater detail herein.

Therefore, the wearable electronic device of the present invention may have, or in lieu of or in addition to timekeeping functionality, functionality related to altitude, temperature or compass measurements, barometric pressure, heart rate display, blood pressure (and/or combinations thereof), the display of tide information such as whether the tide is high or low, sunset information, moon phases, medical information such as when medicine should be taken and how many pills at each time interval, a count-down timer, and/or related to any one of the additional parameters set forth above, any and/or all of which may be in addition to or in the absence of conventional timekeeping functionality.

To be sure, many of the foregoing details, as well as other features and advantages that can be appreciated by the present invention, can be found in U.S. Pat. No. 7,113,450, the disclosure of which is incorporated by reference in its entirety as if fully set forth herein.

Thus, it can be seen that in accordance with a first embodiment of the present invention, the electronic device may be a timepiece having the configuration and construction as set forth in the figures herein and/or in the patents incorporated by reference herein. The wearable electronic device may be a timepiece such as a wristwatch, and thus may comprise other features and parts, as would he understood by those skilled in the art.

For example, many details applicable to the present invention may be found in coowned U.S. Pat. No. 7,120,091 ("Electronic Device With Calendar Function"); U.S. Pat. No. 7,113,450 ("Wearable Electronic Device With Multiple Display Functionality"); U.S. Pat. No. 7,027,361 (Perpetual Calendar For a Timepiece"); U.S. Pat. No. 7,027,362 ("Multifunctional Rotating Ring in a Timepiece"); and U.S. Pat. No. 7,023,762 ("Date Display Assembly for an Analog Timepiece"), as well as coowned published application No. US 2010/0046328, the subject matter of which are fully incorporated by reference as if each one were fully set forth herein. For example, the present disclosure omits, for purposes of brevity, certain basic and very well known concepts regarding the construction of chronograph and other types of analog timepieces. For example, the basic construction and arrangements of gears and/or gear trains to rotate a plurality of "standard" hands all supported on a center stem, such as an hour hand, a minute hand and a "seconds" hand, are omitted as being well within the purview of one skilled in the art, as are details for ring rotations, such as for the date by way of example. Likewise, certain known constructions and arrangements of gears and/or gear trains to design a chronograph watch will likewise be omitted as being well within the purview of one skilled in the art, although again, such details can be found, for example, in the patents incorporated by reference herein.

Figure 1A:
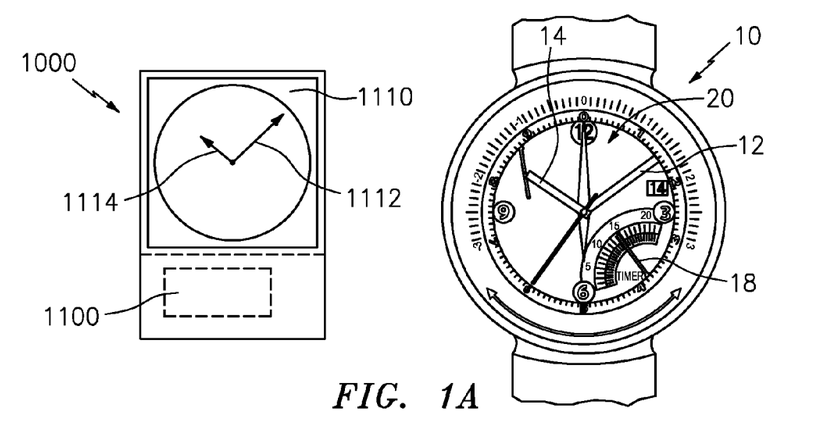
FIGS. 1A, 1B and 1C illustrate an arrangement comprising a transmitting device and a wearable electronic device in accordance with a preferred embodiment of the present invention, illustrating an exemplary sequence of changing the time of day on the wearable electronic device.
Figure 1B:
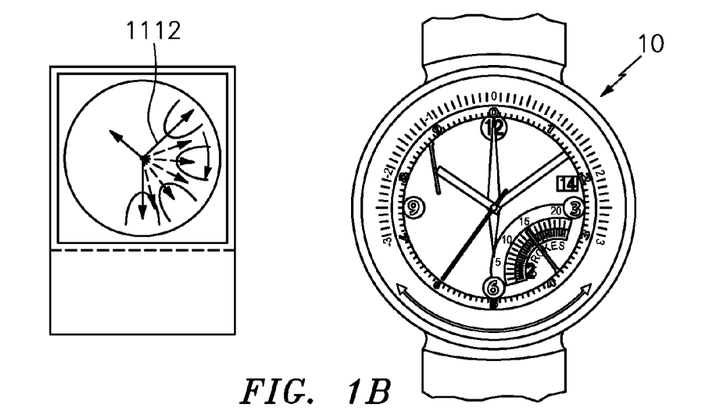
Figure 1C:
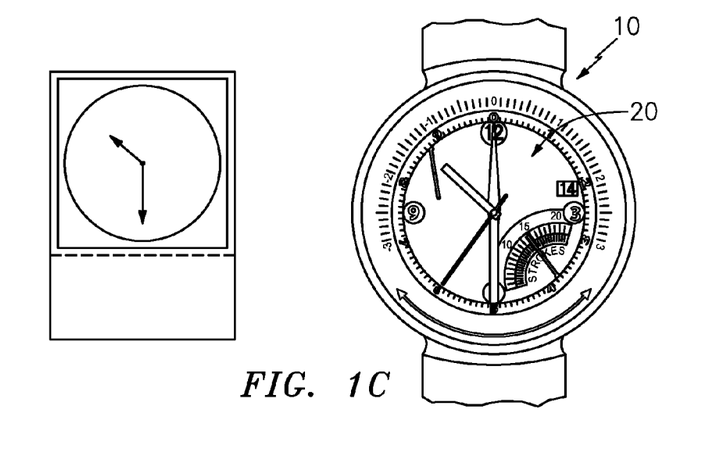
Figure 2:
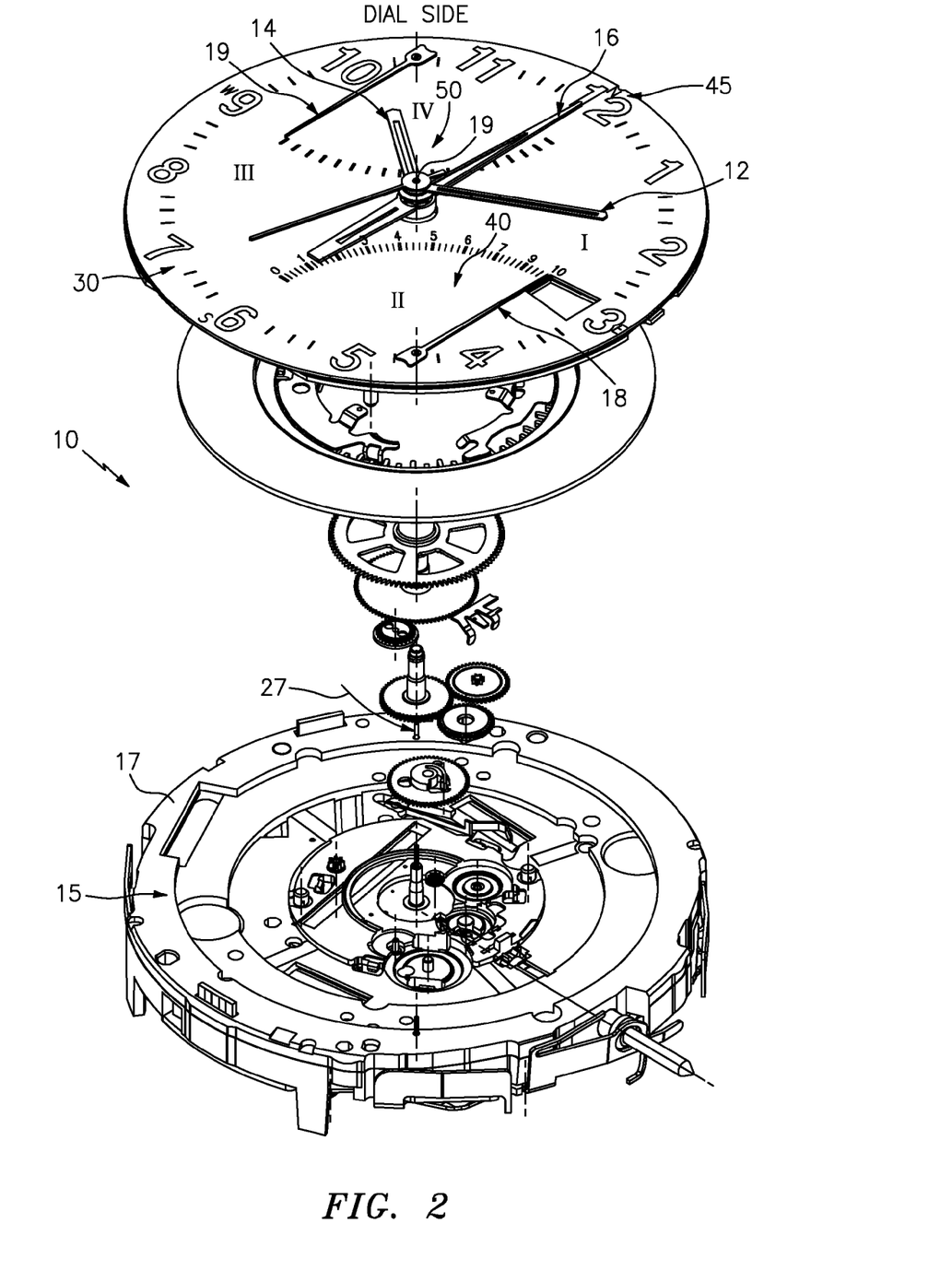
FIG. 2 illustrates the construction of an exemplary wearable electronic device constructed in accordance with a preferred embodiment of the present invention.

Turning now to a first feature of the present invention. FIGS. 1A-1C each illustrate a wearable electronic device, generally indicated at 10, which is of the type wherein information is conveyed in an analog manner at least in part by the use of at least one display indicator. By way of using the phrase "analog manner" for purposes of this invention and patent application, it is intended to mean displaying by using at least a display indicator, such as display hand or display ring or other elongated member. A digital display, without more, such as without a display hand or display ring associated with the digital display, is not in an "analog manner."

FIGS. 1A-1C illustrate a plurality of display hands, with reference to this first feature of the present invention being made to minute hand 12 and hour hand 14. To be sure however, the use of display hands are by way of example and not limitation. For example, the present invention is equally applicable to substituting one or more other display indicators in place of the display hands. For example, instead of a display hand it is possible to use a ring or other type of elongated member. The use thereof will be described and/or be apparent from the disclosure herein. A linear indicator, such as that disclosed and claimed in U.S. Pat. No. 7,515,508 the subject matter of which is also incorporated by reference as if fully set forth herein, can also be used in connection with the present invention.

As illustrated in the figures, wearable electronic device 10 is operationally coupleable to a transmitting device, generally indicated at 1000. By operationally coupleable, it is intended to mean that wearable electronic device 10 and transmitting device 1000 communicate with each other via a wired or wireless link. In a preferred embodiment, the operational coupling is wirelessly through a low power radio system. The design and construction of such a low power radio system would be well known to those skilled in the art.

In a preferred embodiment, transmitting device 1000 comprises hardware and/or software that performs certain functions. To be sure, it is contemplated that separate and/or unitary hardware and/or software modules could be employed for such functionality, which includes at least (i) viewing a simulation of a display provided on the wearable electronic device, (ii) changing information displayable on the simulated display and (iii) transmitting at least one of (a) the changed information and (b) information from which the changed information is derivable to the wearable electronic device.

In a preferred embodiment, transmitting device 1000 is provided with a LCD or other type of digital display. Preferably, device 1000 includes a touchscreen, the construction of which is understood by those skilled in the art. For example, PDAs and/or cell-phone constructions (e.g. smartphones, such as an iPhone as but just one example, although other devices, such as for example and not limitation, media players with transmit and/or receive functionality) are good examples of transmitting devices for use in connection with the present invention having such touchscreen functionality. As such, transmitting device 1000 is provided with such software and/or hardware to provide for the viewing of a simulation of a display provided on the wearable electronic device. By this, it is intended to mean that device 1000 can show a representation of a display that can be provided on the wearable electronic device 10. By way of example, FIGS. 1A-1C illustrate a "time of day" analog watch face on the display of transmitting device 1000, and in accordance with the present invention. It can be seen that this "time of day" display is a display provided on wearable electronic device 10.

As stated above, transmitting device 100 has software and/or hardware to provide for the changing of information displayable on the simulated display. For example, in FIG. 1A, touchscreen display 1110 of device 1000 displays the time of day (TOD) as 10:09 (a.m. or p.m.). In FIG. 1B, it can be seen that the information (e.g. the time of day) is being changed. This change is being effectuated by a user's finger moving across the display touchscreen and in a clockwise direction. By "dragging" display hand 1112 on display 1110 from the "09" position on the simulated watch dial to the "30" (Le. "half hour") position on the simulated watch dial, the information displayable on the simulated display (i.e. display 1110) is changed from 10:09 to 10:30.

Transmitting device 1000 is also provided with software and/or hardware to provide for the transmitting at least one of (a) the changed information and (b) information from which the changed information is derivable to the wearable electronic device 10. For example, transmitting device 1000 may simply transmit, via a wire or wirelessly, the changed information to the wearable electronic device 10. In the illustrated example, transmitting device 1000 may simply transmit data comprising the "21 minute" change of the time of day. Alternatively, it should be understood that transmitting device 1000 may also transmit to the wearable electronic device information from which the changed information is derivable. In this way, it is within the contemplated configuration that transmitting device 1000 transmits to the wearable device 10 information based on which device 10 accesses its respective own memory, look up table, etc. to derive the changed (e.g. "21 minutes") information. As such, wearable device 10 comprises memory or the like to carry out this functionality.

In addition, therefore, in a preferred embodiment, wearable electronic device comprises at least a receiver (e.g. receiver 115 in FIG. 6) for receiving, from the transmitting device 1000, at least one of (i) the changed information (e.g. the "21 minutes") and (ii) the information from which the changed information is derivable; a controller assembly, operatively coupled to the receiver, for at least one of processing the changed information and deriving the changed information (e.g. in a lookup table, memory or the like, the ability of the controller to "figure out" that the "changed information" is "21 minutes"); and at least one actuation mechanism, which in a preferred embodiment is a stepper motor, which is operatively coupled to the controller assembly, for moving and/or rotating, as the case may be, the at least one display indicator (e.g. hands 12 and/or 14) linearly in the case of a linear indicator and in at least one of a clockwise and counterclockwise direction in the case of a ring or display hand, based at least in part on the "changed information." In this way, the "changed information" is thereafter reflected on the wearable device's display, generally indicated at 20, of the wearable electronic device 10 in the analog manner by the at least one display indicator (e.g. hand 12). For example, FIG. 1C illustrates how the "changed information" (e,g. the "21 minute" advance in the TOD) is now reflected on display 20 of the wearable electronic device 10 by the display now showing the time of day to be 10:30.

Reference is also briefly made to FIGS. 2-6 in connection with further details of the present invention. To be sure, many of the details are set forth in the aforementioned U.S. Pat. No. 7,113,450, incorporated by reference here, but out of an abundance of caution, the following is particularly set forth.

As alluded to above, in accordance with a preferred embodiment, the wearable electronic device further comprises a dial 30 having a dial side and an actuation mechanism side, wherein the at least one display indicator, such as hand 12 or hand 14, is positioned on the dial side of the dial; wherein at least one of the changed information and the information from which the changed information is derivable is transmitted via a signal transmitted by the transmitting device 1000 over at least one of a wired link and a wireless link, the transmitting device being physically separated from the wearable electronic device, as illustrated in FIGS. 1A-1C; and wherein the direction of the movement (e.g. rotation in the case of a rotational display hand or ring) of the at least one display indicator is based at least in part on the signal received by the receiver and transmitted by the transmitting device. In a particularly preferred embodiment, the changed information and/or the information from which the changed information is derivable is transmitted via a signal transmitted by the transmitting device over a wireless link in the preferred low power radio system.

Figure 3:
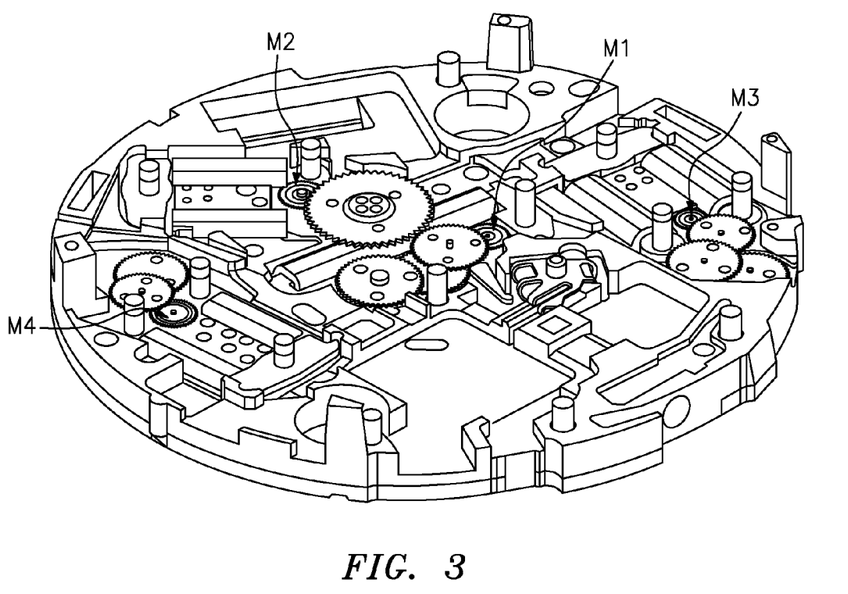
FIG. 3 is a perspective view of exemplary gearing and motors in a movement assembly for a wearable electronic device constructed in accordance with the first embodiment.

Preferably, wearable electronic device 10, in order to carry out all the functionality set forth and/or contemplated herein, is provided with one or more subassemblies, each of which may comprise at least one actuation mechanism and one or more gears rotateably engaged with the actuation mechanism, wherein actuation of the actuation mechanism causes the rotation of the one or more gears. As illustrated in FIG. 3, the preferred actuation mechanisms are stepper motors designated generally as M1, M2, M3 and M4 all of which are disposed in the module of wearable electronic device 10. As would be understood in the art, their specific location is one of design choice and dictated by constraints such as spacing, power and torque requirements and the desired positioning of the display hands and/or rings, such as those disclosed in the patents incorporated herein by reference and illustrated herein. As positioned, the respective motors rotate respective pinions (or rings as the case may be), as would be understood in the art and/or after a review of the patents and application incorporated herein by reference. For the convenience of the reader however, it should be understood that as exemplary illustrated herein, motor M1 is provided to rotate at least hour hand 14 and minute hand 12 (and a second hand, as provided) all in a known manner. In a similar manner, hand 16 is rotated by stepper motor M2, and a gear train is provided to convey the rotational activity generated by the rotor of motor M2 to hand 16. Likewise, hands 18 and 19 are each respectively rotated by stepper motors M3 and M4, and respective gear trains may be provided to convey the rotational activity generated by the respective rotors of motors M3 and M4. The construction of the respective gear trains are well within the purview of one ordinarily skilled in the art.

Figure 4:
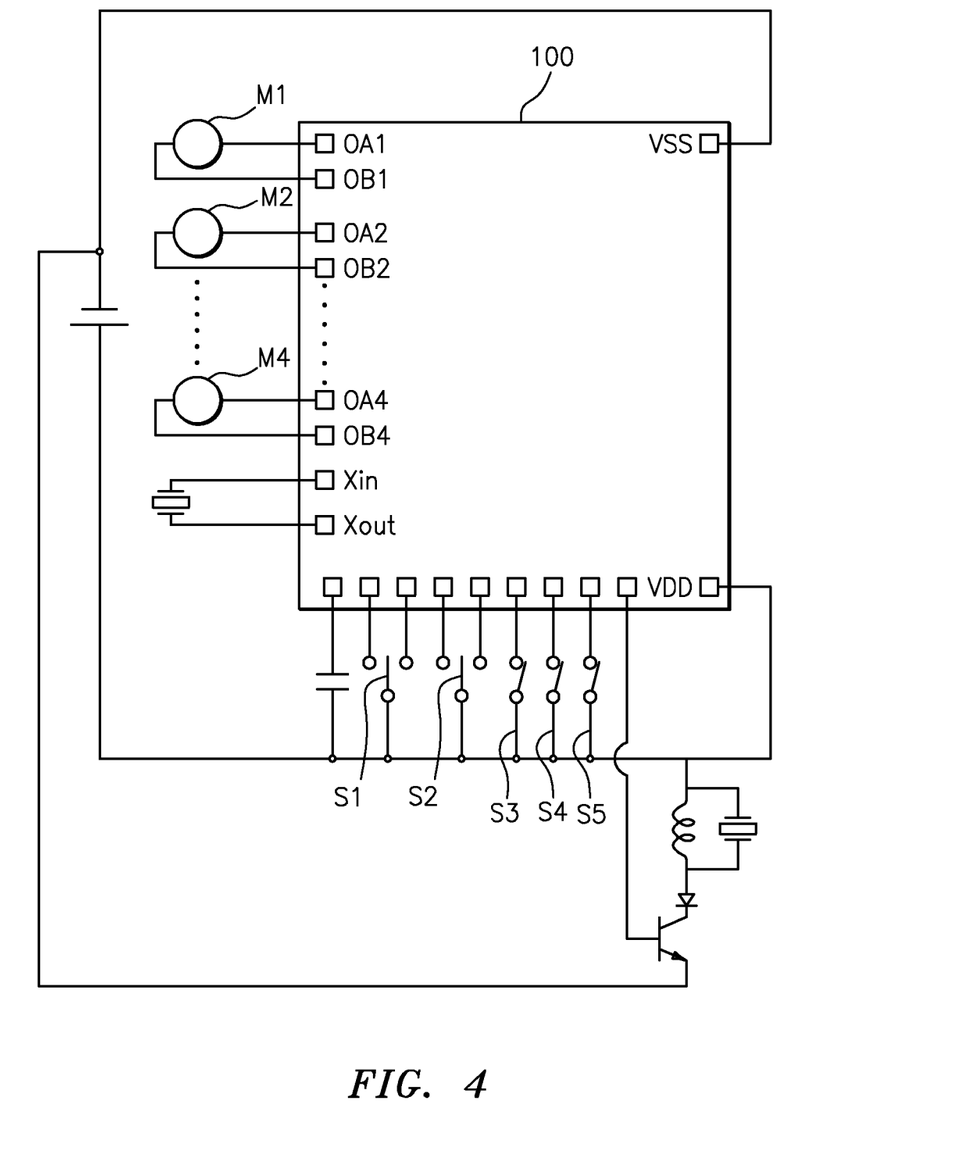
FIGS. 4-6 are block diagrams showing among other things, a controller assembly for use in a wearable electronic device constructed in accordance with a preferred embodiment of the present invention.
Figure 5:
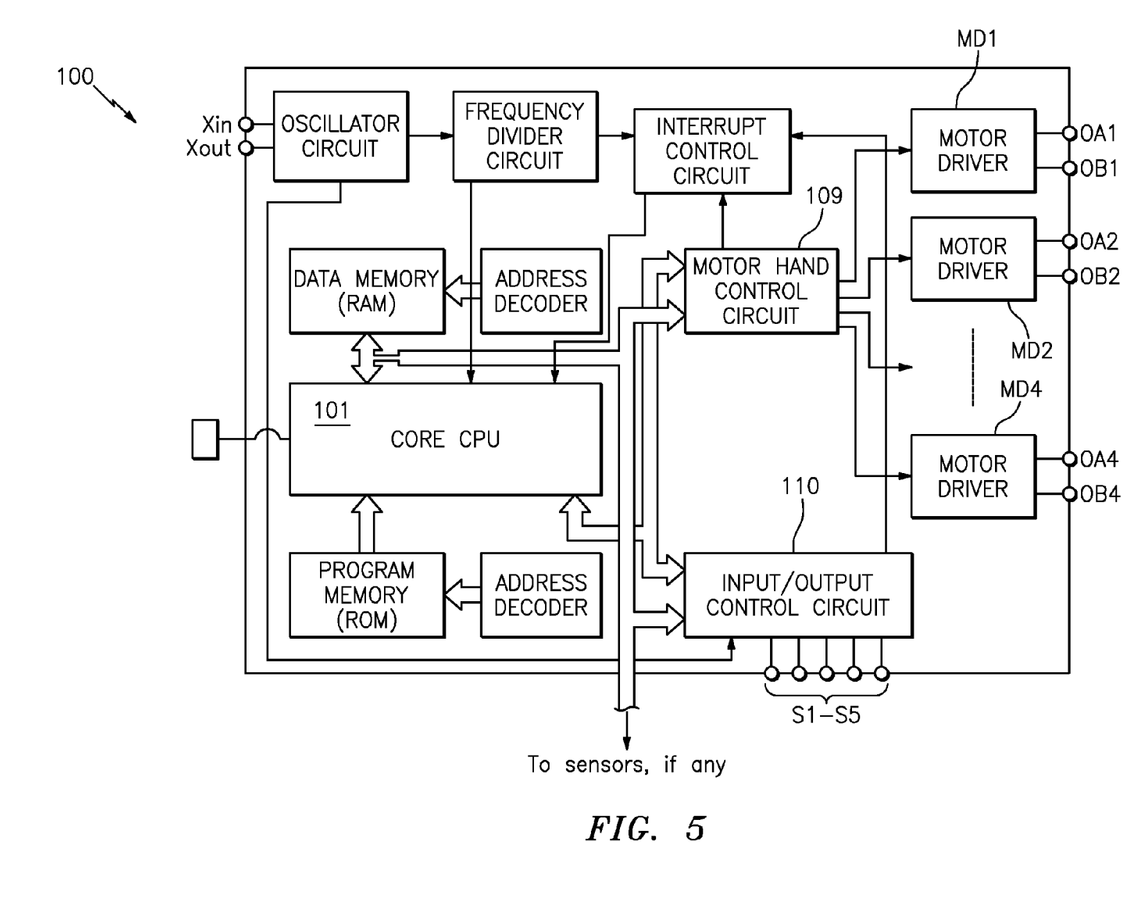
Figure 6:
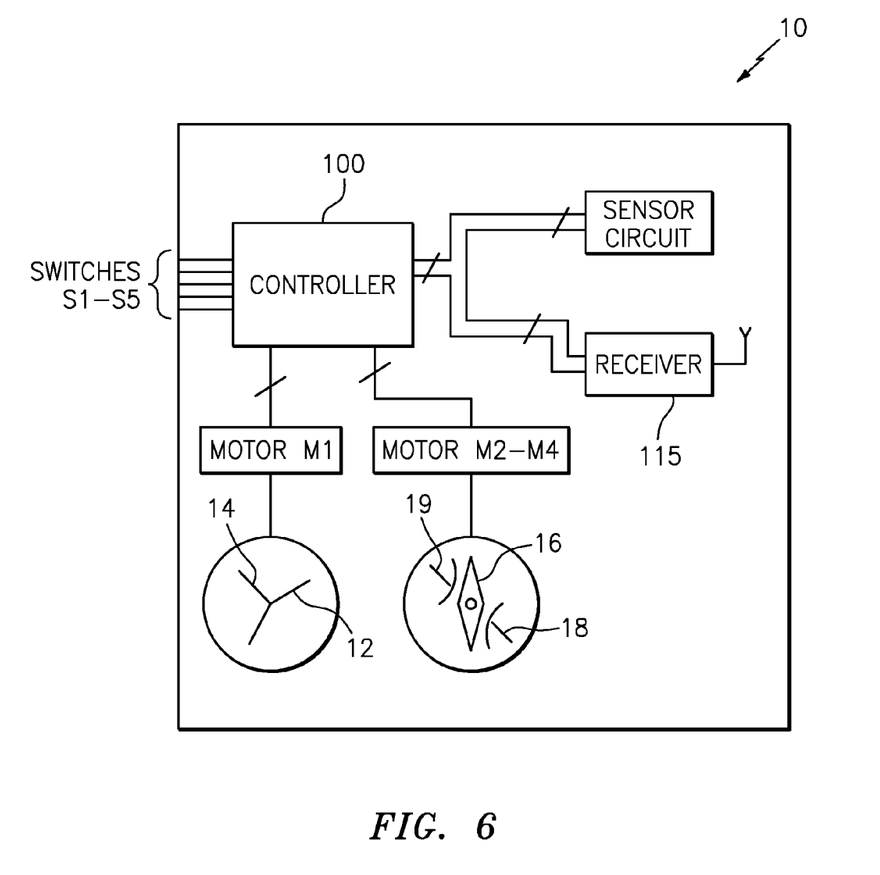

FIGS. 4-6 illustrate many features in accordance with the present invention, including a controller assembly that provides the proper and accurate controlling, positioning and rotation of the one or more display hands and/or any rings (e.g. a date ring by way of example and not limitation). Details of a controller assembly, generally indicated at 100 in the figures, can likewise be found in many of the aforementioned cited patents (with reference to controller 100 therein), and the controller assembly 100 of the present invention preferably comprises all of the functional features described therein to carry out the objectives and features of the present invention. The added functionality particular to the present invention shall now be disclosed, along with several details to ensure completeness of the disclosure.

For example, FIGS. 4-6 illustrate among other things, interface connections to motors M1, M2, M3 and M4, and pushers, which are illustrated schematically as switches S1-S5. However, it is understood that the switches are also intended to generically indicate both side/top mounted pushers, as well as side mounted rotatable crowns, and thus respond to the actuation (i.e. pulling and/or pushing) action thereof.

FIGS. 5 and 6 illustrate block diagrams, including of controller assembly 100. Particular reference is made to motor control circuit 109, which receives a commanded "next number of pulses" from CPU core 101 and generates the pulsed and phased signals necessary to move a desired motor (e.g. M1-M4) a desired amount and in a desired direction. Pulse outputs of motor control circuit 109 are buffered by motor drivers MD1-MD4 and applied to the respective motors M1, M2, M3, M4. An input/output control circuit 110 can controls any crown/stem actuations and/or pushbutton switches S1-S5 and provides such signaling information to CPU 101. The use of the pushers and/or the crown can effectuate a change in operating modes, as would be understood by one skilled in the art.

Importantly, controller assembly 100 causes the changed information (i.e. what is now illustrated in FIG. 1C on the simulated display of the transmitting device 1000) to be thereafter reflected in the information displayed in the analog manner by the at least one display indicator (e.g. hand 12), by causing the rotation of the at least one display hand in at least one of the clockwise and counterclockwise directions as necessary.

That is, controller assembly 100, preferably knows the mode and/or the displayed informational indicia (e.g. hour, minute, month, date, day, a count up or down timer, etc.) appearing on the display of device 10, as well as the position of the rotors for the respective motors M1-M4, and causes the respective actuation mechanism(s) to rotate so that the selected display hand and/or the ring, as the case may be, could move or otherwise rotate the appropriate amount. Moreover, the hand and/or ring calibration methodologies disclosed in the aforementioned patents also assist in ensuring that the hands and/or ring are accurately positioned to display information that is reflected in the analog display of the wearable electronic device 10. For such calibration purposes, the methodologies and constructions set forth in U.S. Pat. No. 7,266,051, entitled "Method and Construction for Autocalibrating an Actuation Mechanism," the subject matter of which is incorporated by reference in its entirety as if fully set forth herein, may be implemented.

Alternatively, in the case where the controller assembly 100 does not "know" the precise position of the display indicators, the transmitting device may simply transmit data indicating how many steps the associated stepper motor should rotate. In this way, the wearable device 10 could act as a "dumb" device but still be able to accurately reflect the "changed information."

That is, as would be understood in the art, the actuation mechanism, whether it is stepper motor M1, M2, M3 and/or M4, itself comprises a rotor, and is operatively coupled to the controller assembly, wherein the stepper motor steps in at least one of a clockwise and counterclockwise direction in predefined increments in response to commands from the controller assembly, wherein the rotor of the stepper motor is operatively coupled to the at least one display hand, and wherein the rotation of rotor causes the rotation of the at least one display hand in at least one of the clockwise and counterclockwise directions and in the predefined increments.

In the illustrated example of FIG. 1, the changed information is a change in minutes, but certainly, a change in minutes and hours (or hours alone (e.g. in a change in "timezone")) is certainly within the scope of the present invention. In such embodiments, a user may use his/her fingers on the touchscreen to change information displayable on the simulated display (i.e. dragging the minute hand 1112 in a clockwise rotation). A simple button push (e.g. "send") will transmit the applicable signal and data to the wearable electronic device and cause the actual minute hand 12 and the hour hand 14 of device 10 to rotate. The applicable signal and data may be the changed information data itself and/or information from which the changed information is derivable in device 10.

A similar methodology may be used to advance a date ring (e.g. the ring indicating that the date is currently displayed as "14" in FIGS. 1A, 1B, 1C), wherein the controller controls the rotation of the actuation mechanism (e.g. stepper motor) associated with the date ring. A similar ring could be used to display day or month information on a smaller ring (e.g. the size of a chronograph "eye" or the like) or one that spans almost the entire dial, similar to a traditional "date" ring.

To be sure therefore, the present invention is also directed to an arrangement comprising both the wearable electronic, device of the type described above and a transmitting device as described above. Moreover, in a preferred embodiment, the transmitting device is physically separate from the wearable electronic device, the changed information and/or the information from which the changed information is derivable is transmitted via a signal transmitted by the transmitting device, and such transmission is over a wireless link. However, other configurations while remaining within the scope of the invention are contemplated hereby.

Applicable to all embodiments herein, it is preferable that transmitting device 1000 know of the model and/or type of wearable electronic device 10. In this way, transmitting device 1000 includes hardware and/or software that permits the storing of information about the specific wearable electronic device or type thereof For example, such information could be stored in transmitting device 1000 at the time of manufacture, it could be downloaded by the user from, for example, the Internet (in the form of for example, an "app") or in another preferred implementation, could be provided to the transmitting device 1000 directly (e.g. downloaded) from the wearable electronic device itself. Transmitting device 1000 could also "read" a barcode, QR code or the like on or associated with the device 10 to thus acquire the specifics thereof In this way, when the display of the transmitting device simulates the display of the wearable electronic device, a user is able to feel like he or she is looking at the display of the wearable electronic device itself because the transmitting device has stored therein all the displays available to the wearable device 10. To be sure therefore, in the figures of FIGS. 1A-1C, the display 1110 has been simplified for purposes of only describing the TOD change. In a commercial embodiment, the simulated display of the watchface on display 1110 may be made to look identical to display 20 of device 10. Module 1100 in transmitting device 1000 is intended to represent all the hardware and software disclosed herein and applicable or attributable to the functionality of transmitting device 1000, including but not limited to permitting, causing and effectuating the (i) viewing of a simulation of a display provided on the wearable electronic device, (ii) changing information displayable on the simulated display and (iii) transmitting at least one of (a) the changed information and (b) information from which the changed information is derivable to the wearable electronic device. Module 1100 is also operatively coupled to display 1110 as would be understood in the art. The setting and/or changing of an alarm time, such as using the displays in FIGS. 1A-1C in connection with display hands 18 or 19, is also contemplated herein.

As will thus be seen, in a preferred embodiment, the present invention is directed to a method of changing information on a wearable electronic device of the type wherein information is conveyed in an analog manner at least in part by the use of at least one display indicator, wherein the wearable electronic device is operationally coupleable to a transmitting device, wherein the transmitting device comprises means for viewing a simulation of a display that is displayable on the wearable electronic device, changing information displayable on the simulated display and transmitting at least one of (i) the changed information and (ii) information from which the changed information is derivable to the wearable electronic device, wherein the method comprises the steps of viewing, on the transmitting device, a simulation of a display that is provided on the wearable electronic device; changing information displayable on the simulated display; transmitting at least one of (i) the changed information and (ii) information from which the changed information is derivable to the wearable electronic device; receiving, by the wearable electronic device, at least one of (i) the changed information and (ii) information from which the changed information is derivable from the transmitting device; in the wearable electronic device, at least one of processing the changed information and deriving the changed information; and moving the at least one display indicator in a direction based at least in part on the changed information; wherein the changed information is thereafter reflected on the display of the wearable electronic device in the analog manner by the at least one display indicator. In a preferred methodology, the display indicator is a display hand and the step of moving the at least one display indicator comprises the step of rotating the display hand in at least one of a clockwise and counterclockwise direction based at least in part on the changed information. If the transmitting device does not otherwise already have stored therein the particulars of the wearable device 10, then a preferred method also includes the steps of storing, in the transmitting device, information about the specific wearable electronic device or type thereof In the broadest sense, therefore, the wearable electronic device of the type that is operable in at least one, but preferably in a plurality of modes (e.g, TOD mode, an alarm mode and a day mode, just to name a few), wherein the wearable electronic device is operationally coupleable to a transmitting device, wherein the transmitting device comprises means for transmitting a signal for at least one of causing (i) at least one of an enabling and disabling of a feature of a mode in which the wearable electronic device is operable, (ii) a selecting of a mode in which the wearable electronic device is operable, (iii) information that is displayable on a display of the wearable electronic device to be changed, wherein the wearable electronic device comprises a receiver for receiving the signal from the transmitting device; a display that at least one displays (i) the enabled feature of the mode in which the wearable electronic device is operable, (ii) the selected mode and (iii) the changed information; and a controller assembly, operatively coupled to the receiver, for processing the signal and based thereon (i) at least one of enabling and disabling a feature of a mode in which the wearable electronic device is operable, (i) selecting a mode in which the wearable electronic device is operable and (iii) causing the adjustment of the information on the display.

As should be appreciated from the foregoing, the present invention is not limited to analog electronic devices, as digital devices, such as a digital electronic device in general and a digital watches in particular, are within the scope of the present invention.

For example, as stated above, the transmitting device may comprise means for transmitting a signal for at least one of causing at least one of an enabling and disabling of a feature of a mode in which the wearable electronic device is operable and the wearable electronic device comprises a receiver for receiving the signal from the transmitting device and a display that displays the enabled feature of the mode in which the wearable electronic device is operable. This feature may manifest itself in a variety of ways, some of which are by way of example and not limitation, in a wearable electronic device having a digital display, the display can enable and/or disable its font, language, colors or shades or layout. Used herein, "enable and/or disable" is used synonymously with "change." Therefore, a "change" in font, language, color, layout, etc, should be understood and interpreted as an enabling or disabling of such a feature. In addition, a function of the watch could also be enabled or disabled in this manner.

Figure 7A:
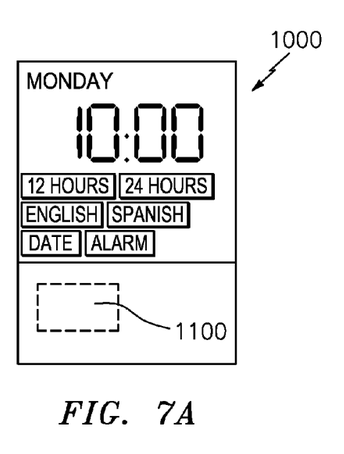
FIGS. 7A and 7B illustrate exemplary displays for a transmitting device in accordance with the present invention.
Figure 8A:
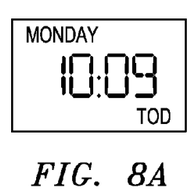
FIGS. 8A, 8B and 8C illustrate exemplary displays for a wearable electronic device having a digital display in accordance with the present invention.
Figure 8B:
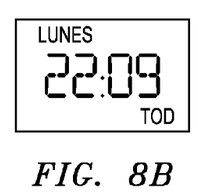

For example, FIG. 7A illustrates a transmitting device 1000 that can display a digital representation of a TOD mode (e.g. 10:09) and day mode ("Monday"). Actuation of the "12 hour" or "24 hour" icons can enable/disable (i.e. change)

whether the wearable electronic device in FIG. 8A or 8B, respectively, displays the TOD mode as 10:09 or 22:09 and thus enables and disables the 12/24 hour display feature. In a similar manner, actuation of the "english" or "spanish" icons of the transmitting device 1000 in FIG. 7A can enable/disable (i.e. change) whether the wearable electronic device displays the "day" information in English or Spanish (compare FIG. 8A with 8B) thus enabling an alternative language feature in the "day" mode.

As but another example, the transmitting device may comprise means for transmitting a signal for at least one of causing a selecting of a mode in which the wearable electronic device is operable and the wearable electronic device comprises a receiver for receiving the signal from the transmitting device and a display that displays the selected mode. Here too, this feature may manifest itself in a variety of way, such as by way of example and not limitation, for wearable electronic devices of the "quartz analog" type, the one or more display hands can change what they are displaying, such as from a display that can selectively display any one of a "power reserve," "day of week," "heart rate," "battery level of the transmitting device," "date," "data trend," "moon phase" and/or "time zone," just to name a few, to any other of such modes.

For example, FIG. 1A illustrates a display in connection with display hand 18 illustrating a "timer" mode, whereas the same display and display hand 18 in FIG. 1II illustrates a "golf scoring" mode, while the display and display hand in FIG. 1C indicates a "winter/summer" daylight savings indicator mode. Alternatively, a chronograph "eye" could change its mode from a conventional "minutes" to a yacht race start timer, just to name but one example.

Figure 7B:
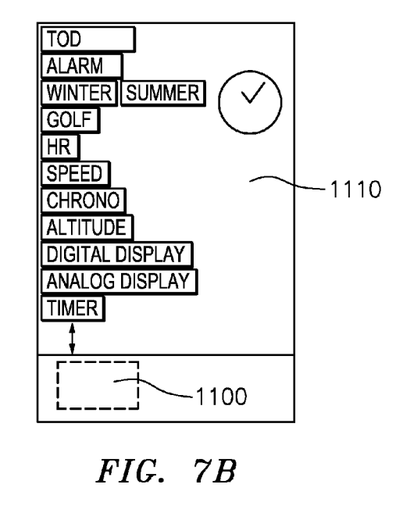

Here, the transmitting device might have a plurality of simulated modes from which a user could scroll and/or select by the touchscreen or a pusher, for example, as illustrated in FIG. 7B. Sending a signal to device 10 will effectuate the selection of the selected mode on device 10. In this way, it can be seen that the wearable electronic device is operable in a plurality of modes, the wearable electronic device comprising at least one display hand to convey information in an analog manner in at least a first mode and a second mode both of which are selected from the plurality of modes, wherein the controller causes the at least one display hand to change from conveying information in the first, mode to conveying information in the second mode after the controller selects the mode in which the wearable electronic device is to operate. Preferably to best appreciate this feature, the first and second modes are individually displayable (and not at the same time) at the same location, as exemplified in FIGS. 1A-1C by the display in the lower right hand quadrant of display 20.

Figure 8C:
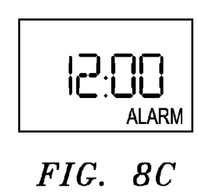
Figure 9A:
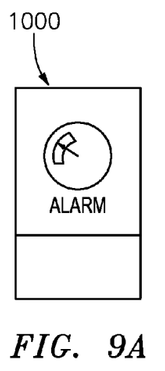
FIGS. 9A, 9B, 9C and 9D illustrate yet further exemplary displays for a transmitting device in accordance with the present invention.
Figure 9B:
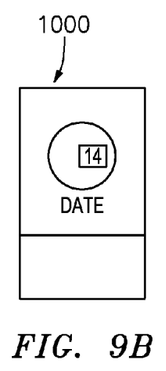
Figure 9C:
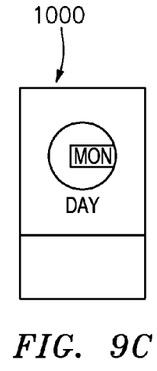
Figure 9D:
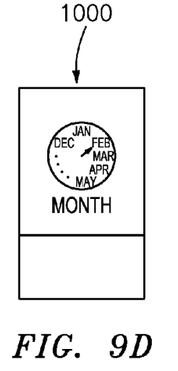

In the digital realm for example, actuation of the alarm indicator (i.e. on the touchscreen) in FIG. 7B will change the displayed mode from the TOD (time of day) in FIGS. 8A, 8B to display the alarm mode (e.g. "12:00") in FIG. 8C.

In a further feature of the present invention, the transmitting device is able to change information in each of the modes. In this way, the wearable electronic device can convey a plurality of types of information in an analog manner; the transmitting device can display a plurality of displays each one respectively being a simulation of a different type of display provided on the wearable electronic display; wherein at least a first display and a second display from the plurality of displays displayable on the transmitting device are selectable and wherein information on each of the selectable displays is changeable; wherein the means for transmitting can transmit, to the wearable electronic device, at least one of changed information and information from which the changed information can be derived associated with each of the selectable displays; and wherein the changed information associated with each of the selectable displays is thereafter reflected on the display of the wearable electronic device in the analog manner by the at least one display hand. As but exemplary embodiments, FIGS. 9A-9D show transmitting device 1000 showing a plurality of displays and a plurality of types of information in an analog manner, each one respectively being a simulation of a different type of analog display that may be provided on the wearable electronic display. Obviously, the types of information can include TOD information, day information and/or month information just to name a few, all of which are depicted.

In yet another embodiment, the transmitting device may comprise means for transmitting a signal for at least one of causing information that is displayable on a display of the wearable electronic device to be changed, wherein the wearable electronic device comprises a receiver for receiving the signal from the transmitting device and a display that displays the changed information. This feature also can manifest itself in a variety of ways, exemplary ones being a change in the time of day as illustrated in FIGS. 1A-1C, a simulated date wheel can be provided on the display of the transmitting device and "rotated" as simulated on the display of the transmitting device in FIG. 1B, or for example, the device 10 could be displaying a golf "stroke" counter as in FIG. 1B, and the transmitting device could have a counter whereby either the user could "rotate" a counter or simply push a button for the "actual" hand 18 to increment on device 10. Other information is also equally changeable, such as a day of the week display hand, a timezone indicator or the month hand or wheel. In a preferred embodiment, all the changes would be effectuated in a similar manner as illustrated in FIGS. 1A-1C.

To effectuate and implement features associated with the selection of modes, as disclosed above, aspects disclosed in U.S. Pat. No. 7,821,878 can be employed. As disclosed therein and incorporated by reference as if fully set forth herein, wearable electronic device 10 may include a dial assembly, such as a non-transparent dial having a dial side and an opposite side, wherein the dial has at least one window, and the display indicator (e.g. hand 18) is positioned on the dial side of the dial, an actuation mechanism operatively coupled to display hand 18 for example, a controller assembly, operable in a first mode (e.g. a "timer" mode as shown in FIG. 1A) and at least a second mode (e.g. a "golf stroke" counter as shown in FIG. 1B), and a display that is operatively coupled to the controller assembly, positioned on the opposite side of the dial assembly (e.g. the non-transparent dial) and viewable through the at least one window in the non-transparent dial. The display displays informational indicia corresponding to the mode in which the electronic device is operating, and wherein the informational indicia is changeable based on the mode in which the wearable electronic device is operating, wherein the positioning of the display hand as it rotates in the one of the clockwise and counterclockwise directions in the predefined increments conveys the information by referring to particular informational indicia, and wherein the controller operatively controls the positioning of the hand so that the hand can convey the information in the analog manner for each of the at least two modes.

In yet a variation of the foregoing, the dial assembly or dial, as the case may be, need not have a window, but that the informational indicia corresponding to the mode in which the electronic device is operating may be provided directly with or made from, for example, F-Ink. In this implementation, the actual labels and indices under the watch hands could be changed based on user preferences. In the former configuration, the display could be of an LCD type wherein the LCD has provided informational indicia that changes upon user selection, an embodiment disclosed in the aforementioned '878 patent.

So, for example, the transmitting device 1000 could cause the scale of the display on the wearable electronic device to change (e.g.: from 1-31 to 1-10, from seconds to minutes, from 1-1000 feet to 1000-10000 feet) or could cause the meaning of the hands to change (e.g.: from Chrono minutes to Chrono seconds). That is, once the signal is transmitted from the transmitting device to the wearable electronic device to cause (i) at least one of an enabling and disabling of a feature of a mode in which the wearable electronic device is operable, (ii) a selecting of a mode in which the wearable electronic device is operable, (iii) information that is displayable on a display of the wearable electronic device to be changed, the wearable electronic device need only change the dial markings (or the LCD display, as the case may be) to effectuate the requested enablement, disablement, selection and/or change of modes or information.

To be sure, each and every of the foregoing embodiments and configurations therefore will comprise a controller assembly, such as controller assembly 100, operatively coupled to the receiver, for processing the signal and based thereon (i) at least one of enabling and disabling a feature of a mode in which the wearable electronic device is operable, (i) selecting a mode in which the wearable electronic device is operable and (iii) causing the adjustment of the information on the display.

In the preferred constructions and methodologies, communication between transmitting device 100 and wearable electronic device 10 may best be achieved through either Bluetooth or the new Bluetooth Low Energy, both of which are well known in the art, since this allows for device 10 to be compatible with the most number of types of transmitting devices. In the most anticipated constructions, transmitting device may be a "smart phone" as would be understood in the art. Technologies to implement other features, e.g. the use of E-Ink, are also well known in the art.

Additionally, the foregoing implementations also may require customized code on transmitting device 1000 for communicating to device 10 (e.g. the watch). Such customizable code could be in the form of an application running on the transmitting device (e.g. an "app.").

To be sure, FIGS. 1A-1C show a simplistic example of a change in time of day, but it is envisioned that if the user has removed and replaced the battery, for example, the time of day and/or the day or date would need more significant advancing. First changing the information on the simulated display can be seen as an easy and convenient way to effectuate the actual change in the device 10.

To be sure, the one or more signals and/or any data sent from the transmitting device to the wearable electronic device could be initiated by a pusher or a "send" signal or the like.

The foregoing sequence can be expanded to any number of display hands or rings on wearable electronic device 10, and the embodiments in those applications incorporated by reference herein show the wide ranging applicability of the present invention. Particular to the present invention, all that would have to be modified would be the indicators and the controller assembly would have to be modified accordingly. Thus, the present invention provides alternative methods and constructions for simply, intuitively and more easily setting, changing, enabling, disabling and/or selecting features, modes or information as the case may be in a wearable electronic device that has a digital display and/or is of the "analog" type (i.e. uses rings and/or hands to display information).

In the preferred embodiments, the motors may be bi-directional stepper motors as appropriate, thus being able to rotate in either direction, and the construction of acceptable stepper motors to functionally operate in this manner are widely available and well within the understanding of those skilled in the art. Suitable dials are also well within the purview of the skilled artisan. One skilled in the art would recognize that varying the number of display hands can vary the number of needed stepper motors, all of which is within the scope of the present invention and disclosure and disclosed in those applications incorporated by reference herein.

Although the preferred embodiments provide that controller assembly 100 is highly integrated wherein all timing and display functionality is controlled in controller assembly 100, alternate embodiments could separate the timekeeping functions from those processing and other mode related information, as would be understood by one skilled in the art.

As should also be appreciated by one skilled in the art, the location, position and/or size of the display indicator and/or display hands are merely dictated, for example, by the position of pinions and the position of the respective subassemblies and thus the illustrations herein are shown by example and not limitation.

The gearing ratio to provide for the desirable display rotation or movement of the display hands or rings would be one of design choice depending on the desired or required incremental rotation of the display indicator. Thus the number of wheels in any particular gearing assembly may be more or less than that disclosed herein, and are really one of design choice for the intended function and based upon a number of criterions known to the ordinary designer. Also, the functionality of the controller can be modified to accommodate the varying embodiments disclosed herein by software-programming techniques or differing controllers, both of which is well within the purview of the skilled artisan.

It can thus be seen that the present invention provides for an improved method and construction for setting, changing, enabling, disabling and/or selecting features, modes or information as the case may be in a wearable electronic device, and the present invention provides an improved user interface therefor that is easy to use and which should be welcome to the user over those arrangements in the prior art.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall therebetween, To be sure, the present invention is applicable to a wide variety of devices and applications. That is, while the following embodiments have been disclosed with reference to particular modes, the scope of the invention is not so limiting.

What is claimed is:

1. A wearable electronic device of the type wherein information is conveyed in an analog manner at least in part by the use of at least one display indicator, wherein the wearable electronic device is operationally coupleable to a transmitting device, wherein the transmitting device comprises means for (i) viewing a simulation of a display provided on the wearable electronic device, (ii) changing information displayable on the simulated display and (iii) transmitting at least one of (a) the changed information and (b) information from which the changed information is derivable to the wearable electronic device, wherein the wearable electronic device comprises:

a receiver for receiving from the transmitting device at least one of (i) the changed information and (ii) the information from which the changed information is derivable;

a controller assembly, operatively coupled to the receiver, for at least one of processing the changed information and deriving the changed information; and an actuation mechanism, operatively coupled to the controller assembly, for moving the at least one display indicator in a direction based at least in part on the changed information;

wherein the changed information is thereafter reflected on the display of the wearable electronic device in the analog manner by the at least one display indicator.

2. The wearable electronic device as claimed in claim 1, wherein the display indicator is a display hand and the movement of the display indicator is in at least one of a clockwise and counterclockwise direction.

3. The wearable electronic device as claimed in claim 2, comprising:

a dial having a dial side and an actuation mechanism side, wherein the at least one display hand is positioned on the dial side of the dial;

wherein at least one of the changed information and the information from which the changed information is derivable is transmitted via a signal transmitted by the transmitting device over at least one of a wired link and a wireless link, the transmitting device being physically separated from the wearable electronic device; and wherein the direction of the rotation of the at least one display hand is based at least in part on the signal received by the receiver and transmitted by the transmitting device.

4. The wearable electronic device as claimed in claim 3, wherein at least one of the changed information and the information from which the changed information is derivable is transmitted via a signal transmitted by the transmitting device over a wireless link.

5. The wearable electronic device as claimed in claim 1, wherein the wearable electronic device is a wristwatch.

6. The wearable electronic device as claimed in claim 1, wherein the at least one display indicator is used for displaying at least one of time of day information, day information or date information.

7. The wearable electronic device as claimed in claim 6, wherein the changed information comprises a change in at least one of the hour of the day and the minute of the hour.

8. The wearable electronic device as claimed in claim 1, wherein the actuation mechanism comprises a stepper motor that itself comprises a rotor, the stepper motor operatively coupled to the controller assembly, wherein the stepper motor steps in at least one of a clockwise and counterclockwise direction in predefined increments in response to commands from the controller; wherein the rotor of the stepper motor is operatively coupled to the at least one display indicator, and wherein the rotation of rotor causes the rotation of the at least one display indicator in at least one of the clockwise and counterclockwise directions and in the predefined increments.

9. An arrangement comprising:

a wearable electronic device of the type wherein information is conveyed in an analog manner at least in part by the use of at least one display indicator;

a transmitting device, wherein the transmitting device comprises means for viewing a simulation of a display provided on the wearable electronic device, changing information displayable on the simulated display and transmitting at least one of (i) the changed information and (ii) information from which the changed information is derivable to the wearable electronic device;

wherein the wearable electronic device comprises:

a receiver for receiving from the transmitting device at least one of (i) the changed information and (ii) the information from which the changed information is derivable;

a controller assembly, operatively coupled to the receiver, for at least one of processing the changed information and deriving the changed information; and an actuation mechanism, operatively coupled to the controller assembly, for moving the at least one display indicator based at least in part on the changed information;

wherein the changed information is thereafter reflected on the display of the wearable electronic device in the analog manner by the at least one display indicator.

10. The arrangement as claimed in claim 9, wherein the display indicator is a display hand, and the wearable electronic device comprises:

a dial having a dial side and an actuation mechanism side, wherein the at least one display hand is positioned on the dial side of the dial;

wherein at least one of the changed information and the information from which the changed information is derivable is transmitted via a signal transmitted by the transmitting device over at least one of a wired link and a wireless link, the transmitting device being physically separated from the wearable electronic device; and wherein increments and direction of the rotation of the at least one display hand are based at least in part on the signal received by the receiver and transmitted by the transmitting device.

11. The arrangement as claimed in claim 10, wherein at least one of the changed information and the information from which the changed information is derivable is transmitted via a signal transmitted by the transmitting device over a wireless link.

12. The arrangement as claimed in claim 9, wherein the wearable electronic device can convey a plurality of types of information in an analog manner;

wherein the transmitting device can display a plurality of displays each one respectively being a simulation of a different type of display provided on the wearable electronic display;

wherein at least a first display and a second display from the plurality of displays displayable on the transmitting device are selectable and wherein information on each of the selectable displays is changeable;

wherein the means for transmitting can transmit, to the wearable electronic device, at least one of changed information and information from which the changed information can be derived associated with each of the selectable displays; and wherein the changed information associated with each of the selectable displays is thereafter reflected on the display of the wearable electronic device in the analog manner by the at least one display hand.

13. The arrangement as claimed in claim 12, wherein a type of information conveyable by the wearable electronic device is selected from the group of: time of day information, day information and month information.

14. The arrangement as claimed in claim 9, wherein the means of the transmitting device stores information about the specific wearable electronic device or type thereof.

15. A method of changing information on a wearable electronic device of the type wherein information is conveyed in an analog manner at least in part by the use of at least one display indicator, wherein the wearable electronic device is operationally coupleable to a transmitting device, wherein the transmitting device comprises means for viewing a simulation of a display that is displayable on the wearable electronic device, changing information displayable on the simulated display and transmitting at least one of (i) the changed information and (ii) information from which the changed information is derivable to the wearable electronic device, wherein the method comprises the steps of:

viewing, on the transmitting device, a simulation of a display that is provided on the wearable electronic device;

changing information displayable on the simulated display;

transmitting at least one of (i) the changed information and (ii) information from which the changed information is derivable to the wearable electronic device;

receiving, by the wearable electronic device, at least one of (i) the changed information and (ii) information from which the changed information is derivable from the transmitting device;

in the wearable electronic device, at least one of processing the changed information and deriving the changed information; and     moving the at least one display indicator in a direction based at least in part on the changed information;

wherein the changed information is thereafter reflected on the display of the wearable electronic device in the analog manner by the at least one display indicator.

16. The method as claimed in claim 15, wherein the display indicator is a display hand and the step of moving the at least one display indicator comprises the step of rotating the display hand in at least one of a clockwise and counterclockwise direction based at least in part on the changed information.

17. The method as claimed in claim 15, comprising the step of storing, in the transmitting device, information about the specific wearable electronic device or type thereof.

\* \* \* \* \*